United States Patent Office 3,510,211
Patented May 5, 1970

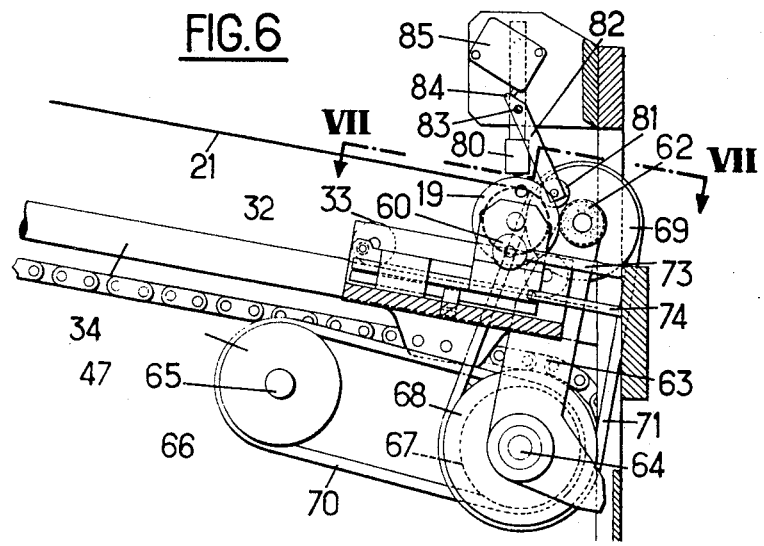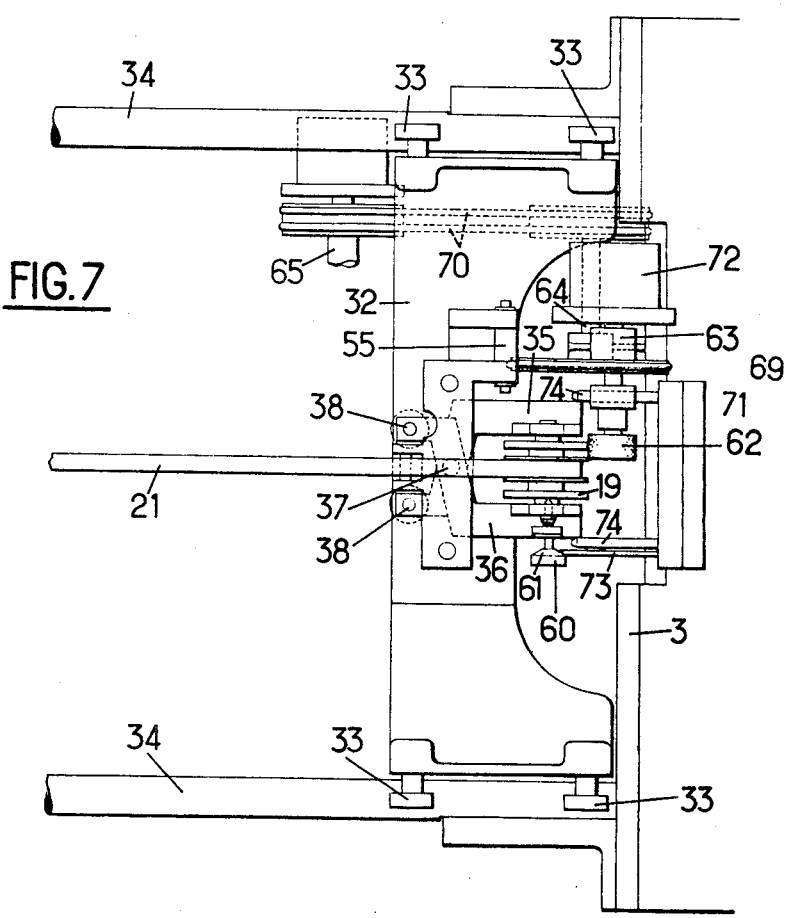

3,510,211
APPARATUS FOR SELECTING AND POSITIONING FILMS
André Lalandre, 5 Rue de la Manutention, Paris, France
Filed July 31, 1967, Ser. No. 657,178
Claims priority, application France, Aug. 3, 1966, 71,988
Int. Cl. G03b 21/04
U.S. Cl. 352—123                     5 Claims

ABSTRACT OF THE DISCLOSURE

Apparatus for selecting and projecting photographic film includes a rotating turret which carries a plurality of film supports. Each support consists of a reel and a pair of jaws adapted to receive a film carrying core, and a carriage for moving a selected core away from the turret to thread the film through projecting elements, such elements being adapted to separate to permit passage of the carriage therethrough.

---

This invention concerns apparatus for selecting and positioning films in an automatic projection machine, such as coin-operated machines which play short sound film sequences in cafes and public places. Most such devices now known are complex and cumbersome, since they entail, for each film, a pair of spools set in a magazine wherein the film is played by reeling the film from one spool to another within the magazine after the magazine as a whole has been selected for play and moved into a position such that the film is held in the projector, which must be in two parts to allow passage therebetween of the portion of the magazine through which the film to be shown will pass.

The aim of this invention is to simplify the construction and reduce the cumbersomeness of the film magazines and at the same time allow for use of simpler projection apparatus, which may be of an ordinary type.

The present invention has for an object the provision of an automatic apparatus for the selection and projection of films. The apparatus includes a revolving magazine, the edge of which is provided with a series of supports each of which holds, side by side, a reel of film and a rimless core or a core with very low rims the end of the film being attached to this core. The apparatus also includes an automatic self-loading projector and a film changer which comprises a carriage which moves on rails, and transfer the rimless core, which corresponds to the film being played, to the other end of the projector and at the same time inserts the film in the projector. Further, the apparatus includes a device to rotate the magazine when operated by a selector control, a device to shut off the projector, and devices to replace the reels used and the carriage. The apparatus may also comprise any of the following singly or in any combination:

(1) Each core is held in its support by jaws which may be separated to permit the placement of the corresponding film reel in playing position.

(2) The carriage, on coming into rest position, breaks contact between the sides of the reel and a roller brake which slows the film as it leaves the reel and permits rewinding by a motor.

(3) The carriage is provided with spring-loaded pincers which are opened when attached rollers contact a cam located at the carriage's rest position and which terminate in two cones, which engage conical seats in the reel cores when the rollers are removed from the cam as the carriage moves.

(4) The pincers comprise a locking pin which seats in holes in the sides of the core to prevent its rotation while the carriage is moving. This pin is automatically retracted when its head engages a stationary cam surface when the carriage reaches the end of its path of travel, after having stretched out the film and brought the core into contact with a driving roller.

In order that the object of the invention may be better understood, one embodiment thereof will now be described, purely by way of illustration, in conjunction with the accompanying drawings, in which:

FIG. 6 is a view, partly on a section, and in larger scale showing the rear of the mechanism.

FIG. 7 is a view taken along the line VII—VII of FIG. 6.

Figure 1:
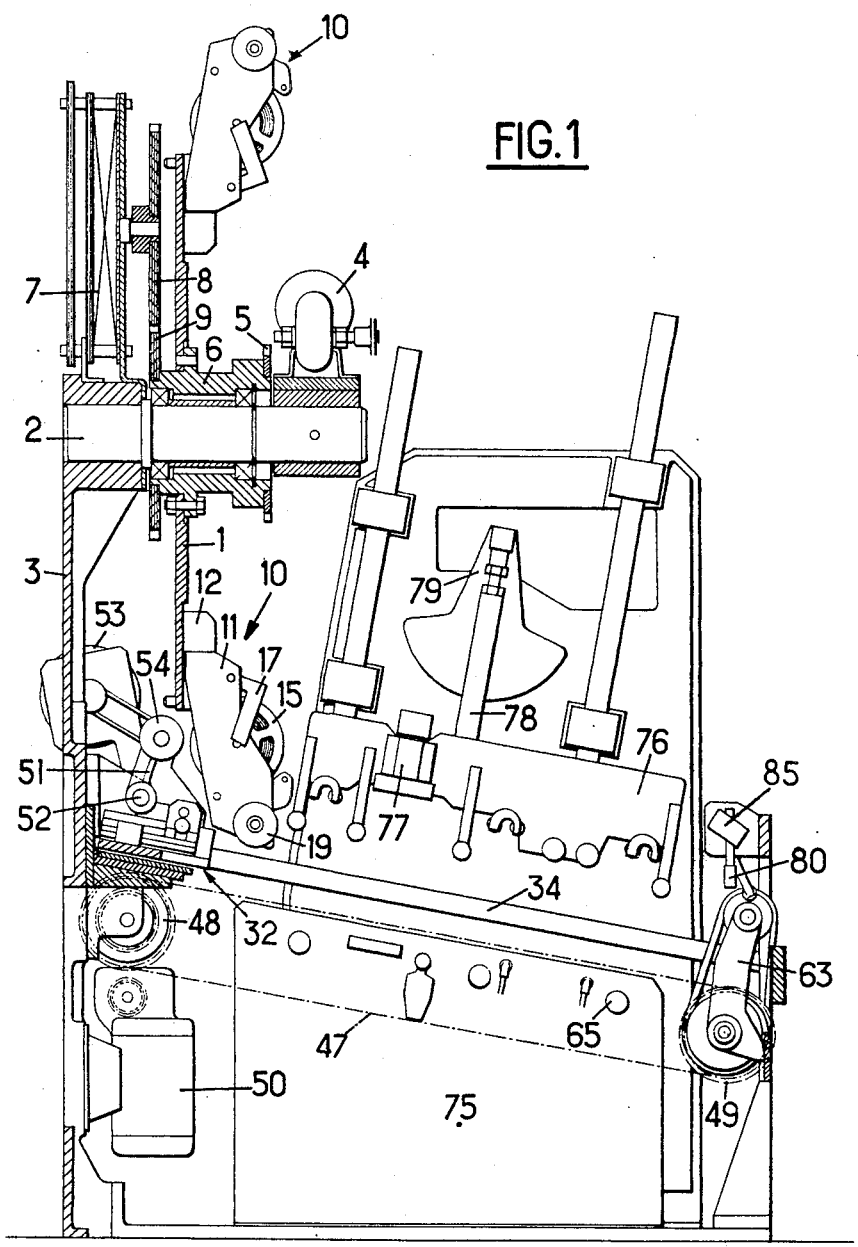
FIG. 1 is a side elevation of the mechanism according to the present invention.

As shown in these drawings, the reel-carrying magazine consists simply of a flat wheel 1 turning on a fixed axis 2 attached to the wall 3 of the machine. This wheel 1 may be rotated by a gear 4 at the end of the axis 2 which, by means of chains not shown, drives the sprockets 5 fixed to the hub 6 of the wheel 1. Selector means 7, driven by the hub 6 through a pair of gears 8 and 9, stops the wheel 1 in the position corresponding to the film selected, for example, by a keyboard.

At the edge of this wheel is a series of identical supports 10 each consisting of two cheek plates 11 connected by a block 12 attached to the wheel 1 by screws 13 and having a centering projection 14 which holds the wheel stationary in the selected position after a selection has been made, due to the engagement of a trapezoidal latch (not shown) between two successive projections.

Figure 4:
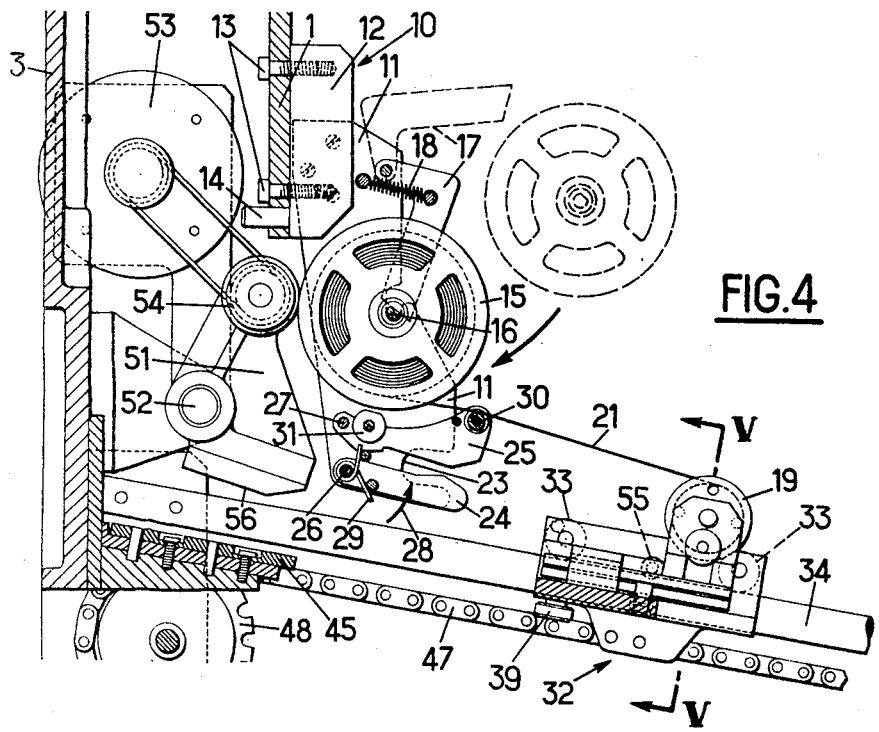
FIG. 4 is a view corresponding with FIG. 2 but showing the carriage displaced.

The axles 16 of the film reels 15 rest in notches in the cheek plates 11 of the support 10 and are held in place by the end of a crank 17, equipped with a spring 18. The crank has two rest positions shown in FIG. 4, one in solid lines and the other in broken lines.

Figure 5:
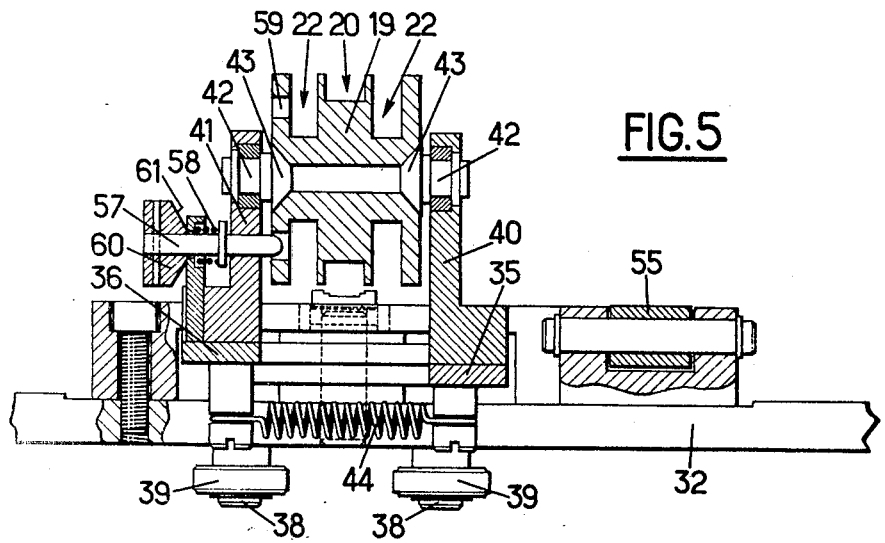
FIG. 5 is a sectional view taken along the line V—V of FIG. 4.

Beside each film reel 15 is a core 19, shown in section in FIG. 5. The end of the film 21 winds around this core after attachment to a central slot 20 in this core. The core also has two lateral necks 22 which slide transversely into seats 23 in each cheek plate 11, and which are held in position therein by two spring-loaded jaws 24 and 25 which pivot on axes 26 and 27. A spring 29 biases the jaw 24 in the direction of the arrow 28. Near the end of the jaw 25 is a feed roller 30 for the film. Near the axis 27 of the jaw 25 is a rubber braking pad 31 which, by pressing on the shoulders of the reel 15, may slow its unwinding.

When the core is brought laterally between the jaws 24 and 25, the upper jaw 25 rises to break the reel 15 and the lower jaw 24 descends to allow passage of the core, and then rises to lock it in position. Both the reel and core are thus held firmly in place with the film running between them and roller 30, thereby permitting wheel 1 to turn without risk of unwinding the various films.

A carriage 32 is used to position the selected film inside the projector. This carriage 32 is provided with rollers 33 which travel on two rails 34 which may be, for example, round steel bars. Other rollers, not shown, are in an oblique position on the underside of the rails. This carriage includes pincer means having two arms 35 and 36, which cross and scissor on an axis 37. These arms have, on one side, axes 38 around which turn rollers 39 (see FIG. 5). The other ends of the arms, 35 and 36, terminate in journal boxes, 40 and 41, in which two small axes 42 are mounted so as to turn freely. Truncated cones on the ends of these axes fit into correspondingly shaped depressions in the centers of the sides of the cores, as shown in FIG. 5. The two arms 35 and 36 are drawn together by a spring 44. A fixed cam 45, particularly shown in FIGS. 2 and 3, is located so that the rollers 39 roll on its sides.

Figure 2:
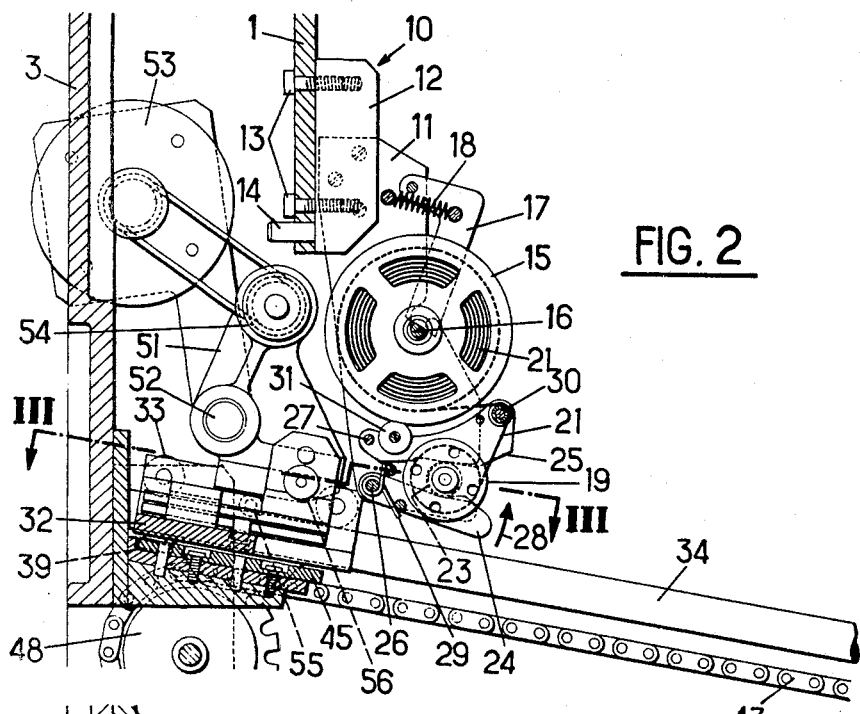
FIG. 2 is a sectional view on a larger scale of the front of the mechanism of FIG. 1.
Figure 3:
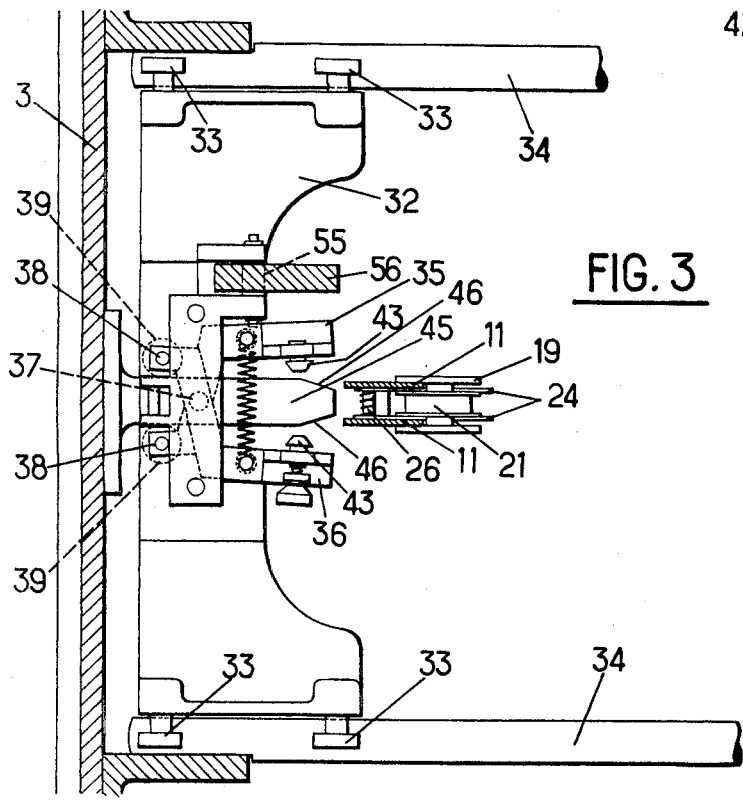
FIG. 3 is a view taken along the line III—III in FIG. 2 showing details of the carriage.

As the carriage 32 moves to the right from the position shown in FIGS. 2 and 3, the arms 35 and 36 remain separated from one another until the conical ends 43 on the axis 42 arrive at the corresponding depressions in the centers of the sides of the core 19. The rollers 39 then descend the inclined ramps 46 on the cam 45 allowing the spring 44 to pull the conical ends 43 together until they engage the corresponding depressions in the core 19. The selected reel core 19 is then automatically seized and transported by the carriage which is moved by an endless chain 47 travelling on two sprockets 48 and 49 and driven by a gear 50 controlled by limit switches, not shown.

When the core is withdrawn from the support 10, the jaw 25 descends so that the rubber braking pad 31 disengages itself from the reel 15. A rewinding device is provided consisting of a support 51 swinging on an axis 52 and having a motor 53 which drives by friction a rubber roller 54 which is normally kept away from the reel 15 by action of a roller 55 of the carriage 32 (see FIG. 5). This carriage rolls on a ramp 56 attached to the mobile support 51. When the carriage advances to take hold of the core, the rubber roller 54 is drawn by a recoil spring (not shown) into contact with the reel 15 before the release of the reel by the braking pad 31.

So that the film 21 may unwind from the reel 15 and not from the core 19 during the movement of the carriage, a spring 58 is provided which engages a small pin 57 in the holes 59 in the sides of each core 19. When the core 19 begins to turn, a hole 59 will reach the position of the pin 57 and the screw will be forced into the hole, thereby immobilizing the core. The pin 57 has a head 60 terminating in a conic portion 61.

When the carriage reaches the other end of the rails 34, as shown in FIGS. 6 and 7, one side of the core 19 contacts a driving roller 62 which turns at the end of a support 63. This support swings on a fixed axis 64 and is drawn forward by a spring. This roller 62 is driven by the axis 65 of the last feeder of the projector. This is accomplished by means of a double set of pulleys 66, 67, 68 and 69, two belts 70 and 71, an electric clutch 72 and a friction clutch which allows slippage.

When the core 19 has made contact with the roller 62, which is now stopped, the edge of a fixed blade 73 presses on the conical portion 61 of the head 60 of the previously mentioned pin 57 so as to extract this pin from the hole 59 thereby freeing the core. At the same time other fixed blades 74 act laterally on the sides of the arms 35 and 36 of the pincer so as to keep them tightly closed.

The projector 75 may be of any modern type. In particular the type described in the French application filed Aug. 2, 1966, and now French Pat. No. 1,494,899, in the name of the applicant under the title "Appareil de projection cinematographique perfertionne," may be used. Any projector used must have a part 76 capable of linear motion on which is mounted the objective 77 and a certain number of feed rollers which feed the film into the driving rollers. This part 76 may be moved by a connecting rod 78 and a winch 79 driven by a gear, not shown.

When the carriage reaches the end of its course, it contacts a switch which actuates a gear closing the projector. Projection begins. The film is drawn firmly by the feed-rollers from the reel 15 which is slowed by the roller 54. The film winds around the core 19 which is frictionally driven by the roller 62. The film 21 progressively fills the neck 20 of the core 19 and then continues to wind around the core being guided laterally by two vertical rollers 80.

A beam of light, preferably upwardly inclined as shown in FIG. 1, is reflected from a single, inclined mirror at the upper rear of the projector. The beam then forms the image on a focussing screen at the front of the projector. In this manner, a normal film may be used and result in an upright picture, since the image is inverted twice, once by the mirror and once by projection on the back of the screen. Naturally the projector 75 is equipped with normal sound reproduction apparatus.

At the end of the film 21, a special lead in which joins the film to the reel 15, interrupts the beam of a photoelectric cell not shown. This action stops the projector, opens the part 76 by means of a half-turn of the winch 79 and starts the rewinding motor 53. Throughout the rewinding process a roller 81 at the end of a lever 82 swinging on an axis 83 rolls along the edge of the film wound on the core 19. When the film is almost completely unwound from the core 19, the end 84 of the lever 82 acts on a micro-switch 85 which actuates the motor 50 to return the carriage 32.

During this movement, the core 19 leaves the roller 62 but the small pin 57 released by the blade 73 again enters one of the holes 59 and immobilizes the core 19. On the other hand, the rewinding motor 53 continues to drive the reel 15 by friction, thus rewinding the excess film as the carriage moves toward the cam 45. When the carriage reaches the end, the pincers replace the core 19 on the support 10, automatically brake the reel 15, and then open under the effect of the com 45 to release this core. At the same time the roller 55 acts on the ramp 56 to remove the rewinding roller 54. A limit switch stops both the motor 50 and the motor 53 and the whole apparatus is then ready for a new cycle. In this stopped position the wheel 1 may turn freely without touching either the carriage or the roller 54, thereby making possible a new selection and the start of another projection.

It will be seen that in the apparatus according to the invention the film magazine is not at all cumbersome and that there is room around its periphery for a great many films, especially if a small size upper gear is used. On the other hand, the projector is very simple and durable since the mobile part 76 may be directly supported by a bracket support extending around the two rails 34 without interfering with the transverse passage for the stretched films. Finally, the processes necessary for the selection, placement, projection and rewinding of the film may be carried out with only a few motors. Aside from the motor 4 which causes the magazine to rotate, the motor which closes the projector, the motor which drives the projector, and the rewinding motor 53, all other movements are caused automatically by the simple displacement of the carriage driven by the motor 50. Consequently the electric control means for the apparatus is also relatively simple.

It will of course be appreciated that this embodiment has been described purely by way of example and may be modified as to detail without thereby departing from the basic principles of this invention.

What is claimed is:

1. Apparatus for the automatic selection and projection of photographic film, which apparatus comprises in combination a magazine comprising a rotatable selector wheel carrying a plurality of supports arranged in a circle thereon, each support comprising means to rotatably support a film reel and a pair of jaws yieldingly biassed toward each other, said jaws being shaped and dimensioned to receive a film-carrying core and said wheel being mounted in turn about a central axis to bring any selected core into a predetermined position; film projecting and driving means comprising a component movable between a first position permitting the introduction therethrough of film to be projected and a second position at which said film may be driven and projected;

a carriage mounted to travel between a storage position adjacent said predetermined core position and a projection position on the opposite side of said projecting and driving means from said predetermined position;

means on said carriage for gripping said core so that said core is carried by said carriage as it moves between said storage and projection positions along a path leading said film through said driving and projecting means, means causing said gripping means to release said core as it is brought between said jaws into said pre-predetermined position at one end of said path of travel but to grip said core as said carriage moves toward said storage position; and 2. Apparatus as claimed in claim 1 in which each pair of jaws comprises a lower jaw spring-biassed toward an upper jaw, said upper jaw being mounted to swing freely and carrying friction means which engages and brakes the reel on the same support when a core is positioned between said jaws.

3. Apparatus as claimed in claim 1 comprising a roller mounted on a pivotable support and biased to engage the film on a core when said core is in projection position and swing as the number of said turns decreases toward a terminal position, and a switch actuated by movement of said roller into said terminal position, said switch being connected to energize the drive means for said carriage.

4. Apparatus as claimed in claim 1 in which said gripping means are pincers and said means for causing said gripping means to grip said core comprises a spring biasing the jaws of said pincers together and a cam positioned to prevent closing of said jaws when said carriage is in one position but permit such closing when said carriage is in another position, and the jaws of said pincers are provided with rotatably mounted conical members adapted to be received in mating recesses in said cores.

5. Apparatus as claimed in claim 1 in which said carriage carries a pin biased to engage an eccentric recess in said core to prevent rotation of said core during movement of said carriage, and said apparatus comprises cam means positioned to drive said pin out of said recess as said carriage approaches its projection position.

References Cited

UNITED STATES PATENTS

| Re. 25,896 | 11/1965 | Mathieu | 352—123 |
| 3,041,925 | 7/1962 | Bavaro | 352—8 |
| 3,367,590 | 2/1968 | Girard. | |
| 3,393,960 | 7/1968 | Mindell. | |

FOREIGN PATENTS 629,789  3/1963  Belgium.

NORTON ANSHER, Primary Examiner

D. S. STALLARD, Assistant Examiner